United States Patent
Suvarna

[11] Patent Number: 6,069,705
[45] Date of Patent: May 30, 2000

[54] MANAGING INTERPRETER COFUNCTIONS ON MULTIPROCESSOR-BASED PRINTER

[75] Inventor: Harish Kumar Suvarna, Fremont, Calif.

[73] Assignee: Texas Instruments Incorporated, Dallas, Tex.

[21] Appl. No.: 08/900,896

[22] Filed: Jul. 25, 1997

[51] Int. Cl.[7] .............. G06F 15/00; G06K 1/00; B41B 11/38; B41J 11/38
[52] U.S. Cl. .............. 358/1.13; 382/180; 382/304; 345/503; 345/505
[58] Field of Search ............................ 395/112, 672, 395/113, 707, 200.3, 677, 872, 875; 382/180, 234, 173, 304; 345/502, 503, 505, 512, 519, 522, 501; 358/1.1, 1.15

[56] References Cited

U.S. PATENT DOCUMENTS

| | | | |
|---|---|---|---|
| 5,212,777 | 5/1993 | Gove et al. | 395/570 |
| 5,287,508 | 2/1994 | Hejna, Jr. et al. | 395/672 |
| 5,333,246 | 7/1994 | Nagasaka | 395/133 |
| 5,355,486 | 10/1994 | Cornaby | 395/672 |
| 5,471,579 | 11/1995 | Kimura et al. | 345/505 |
| 5,594,860 | 1/1997 | Gauthier | 345/501 |
| 5,649,092 | 7/1997 | Price et al. | 395/182.13 |
| 5,652,711 | 7/1997 | Vennekens | 395/116 |

*Primary Examiner*—Edward L. Coles
*Assistant Examiner*—David Rosenblum
*Attorney, Agent, or Firm*—Charles A. Brill; Wade James Brady III; Frederick J. Telecky, Jr.

[57] ABSTRACT

A multiprocessor unit (11) for a printer system. The multiprocessor unit (11) is comprised of a master processor (21) and multiple parallel processors (22). The processing unit (11) interprets a page description program or some other graphics programming. A master processor (21) selects certain interpretation tasks that are to be executed as "cofunctions" and queues these tasks. Cofunctions of the same type are placed in the same queue (30). Parallel processors (22) access the queues and execute the cofunctions.

17 Claims, 4 Drawing Sheets

MANAGING INTERPRETER COFUNCTIONS ON MULTIPROCESSOR-BASED PRINTER

RELATED PATENT APPLICATIONS

This patent application is related to the following patent applications, each assigned to Texas Instruments Incorporated:

U.S. patent application Ser. No. 08/902,709, entitled "Embedded Display List Interpreter for Multiprocessor-Based Printer"; U.S. patent application Ser. No. 08/951,021, entitled "Pattern Filling for Processor-Based Printer"; U.S. patent application Ser. No. _____ (Atty Dkt No. TI-21872), entitled "Screening Method for a Single Chip Multiprocessor"; and U.S. patent application Ser. No. 08/956,402, entitled "Reduced Instruction Processing on a Multiprocessor."

BACKGROUND OF THE INVENTION

Modern electrophotographic printers typically use some sort of processor to interpret a program representing the image to be printed. The program is written in some sort of graphical description language. The interpretation usually involves conversion of the program into machine executable instructions, such as a display list. These instructions are subsequently used to create a bitmap which determines a pattern of light that will expose a photosensitive drum. The exposure of the drum results in a charge pattern on the drum. The drum rotates past a toner dispenser and attracts toner particles to the drum's surface corresponding to the charge pattern. The drum transfers the toner to a print medium such as a piece of paper. The toner is fused to the paper, usually with heat, and the paper exits the printer.

The exposure unit that provides the pattern of light for exposing the drum can be comprised of a laser-scanning device or a spatial light modulator. Spatial light modulators are becoming the technology of choice for full color, high resolution printing at increasingly faster speeds.

As printer hardware improves, methods for providing faster image data processing are also needed. The number of pages printed per minute is highly dependent on the performance of the RIP (rasterized image processing).

U.S. Pat. No. 5,333,246, entitled "Page-Description Language Interpreter for a Parallel-Processing System", assigned to Seiko Epson Corporation, discusses using computers within a network to perform page description interpretation in parallel. However, this is a loosely coupled structure of processing devices, and communication among the processors is slow and complicated.

SUMMARY OF THE INVENTION

One aspect of the invention is a multiprocessor unit for a printer, operable to interpret a graphics description program comprised of interpretation tasks. It is assumed that at least some of these tasks are independent in the sense that their execution does not depend on prior execution of some other task. These independent tasks, further defined below, are referred to herein as "cofunctions". A master processor is programmed to select cofunctions from the rest of the interpretation tasks. It maintains cofunction queues, one queue for all cofunctions of the same type. One or more parallel processors are programmed to execute the cofunctions simultaneously with each other. Each parallel processor executes cofunctions in one queue before executing cofunctions in another queue. Thus, the processing of cofunctions is queue-by-queue. The master processor and parallel processors have shared memory for storing the queues.

An advantage of the invention is that selected interpretation tasks are moved to parallel processors. These tasks are queued in a manner that makes efficient use of the parallel processors, by reducing their instruction cache misses. The master processor's processing burden is reduced, resulting in the ability to print more pages per minute. The multiprocessor solution is a "tightly coupled" solution, in that a shared memory facilitates data access.

DETAILED DESCRIPTION OF THE INVENTION

For purposes of example, the following description is in terms of printer systems that use a spatial light modulator (SLM) to expose a photosensitive drum. The specific SLM device is a digital micro-mirror device (DMD). However, the same concepts could apply to printer systems that use other types of exposure systems, such as scanned laser exposure systems, and that use other types of transfer modes. In general, the invention is useful for any printer system that uses a multiprocessor to interpret a graphics description program. Typically, the graphics description program is in the POSTSCRIPT language, and this assumption is made herein for purposes of example. However, the same concepts apply to any graphics description program used to represent a page for printing.

The invention is directed to using parallel processors of a multiprocessor unit to execute certain interpretation tasks. These tasks are referred to herein as "cofunctions". The multiprocessor unit also has a master processor that is the primary interpreting processor and that queues the cofunctions.

As a result of the interpretation process, the multiprocessor unit converts the graphical description program to a set of machine executable instructions, such as a display list. The multiprocessor unit is further programmed to convert the instructions into bitmapped data. The interpretation process is also sometimes referred to as "scan conversion", a term which has been carried over to SLM-based printers even though they do not scan a beam of light. The process of converting instructions into bitmapped data is also referred to as "rasterization" or "rendering" the image. The "bitmap" is the representation of the image on a pixel-by-pixel basis, and may use grayscale or color values for each pixel. In the case of an SLM, the exposure module may include hardware for converting the bitmapped data into binary exposure data.

Figure 1:
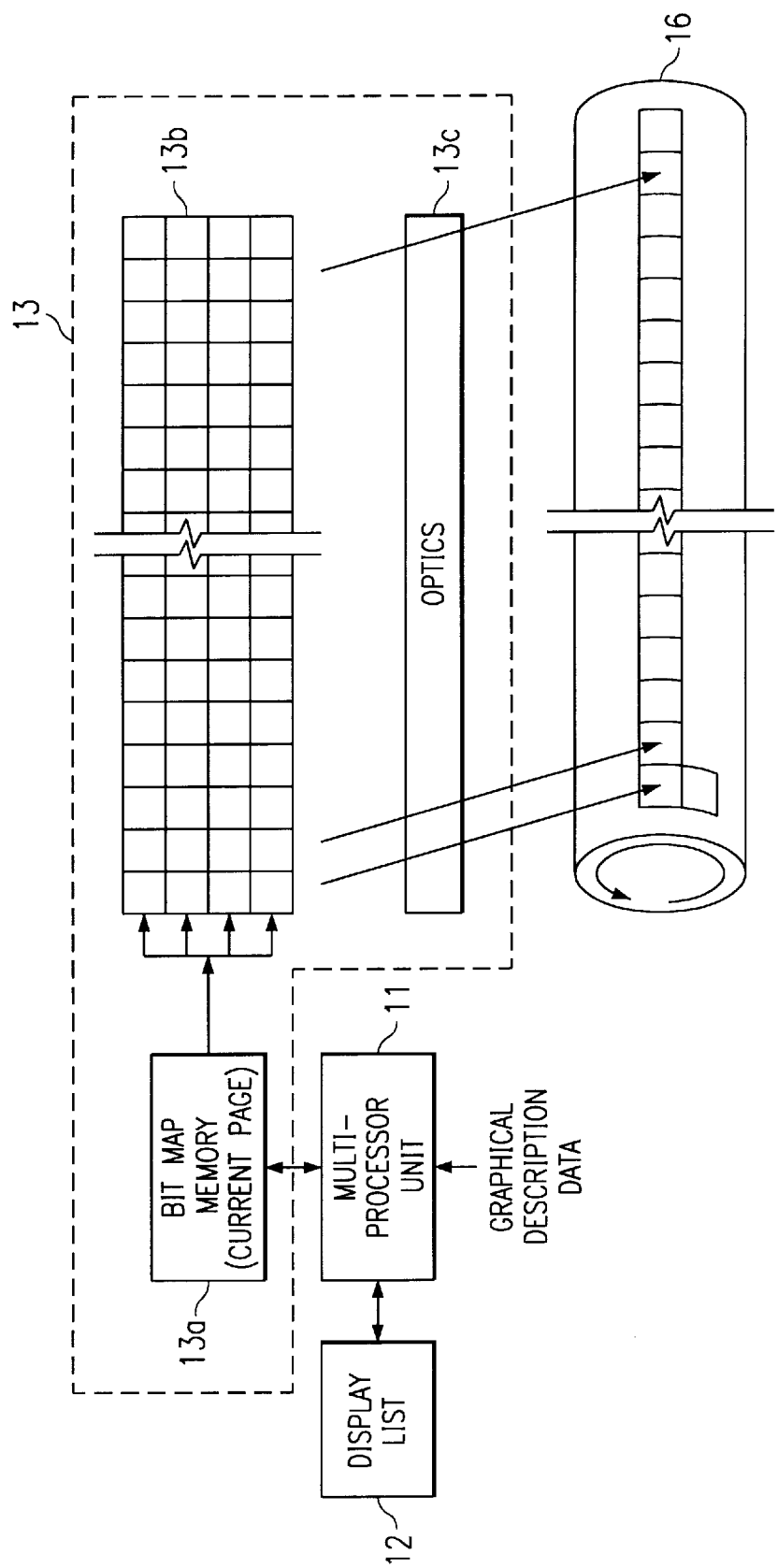
FIG. 1 illustrates portions of an electrophotographic printer, having a multiprocessor unit in accordance with the invention.

FIG. 1 illustrates portions of a printer system relevant to the invention, namely a multiprocessor unit (MPU) 11, a display list memory 12, an exposure unit 13 having a bitmap memory 13a, an SLM 13b, and optics 13c, and a photosensitive drum 16. MPU 11 is configured and programmed in accordance with the present invention, as described below. The basic structure and operation of a suitable SLM-based exposure unit 13 and drum 16 are known in the art of electrophotographic printing. Basically, the exposure of drum 16 is accomplished with SLM 13b, which has an array of light-reflecting or light-generating elements. As stated above, in the example of this description, the SLM is a DMD, which has an array of light-reflecting micromirrors. Each micromirror is electronically controlled to tilt to an on or off position to form an image. Grayscale images are achieved by modulating the intensity, the duration, or the spot size of the exposure. An example of a printer system, having a DMD-based exposure unit, with which the invention may be used, is described in U.S. Pat. No. 5,041,851, entitled "Spatial Light Modulator Printer and Method of Operation", to W. E. Nelson. Various methods of operating an SLM to provide grayscale images are described in U.S. Pat. No. 5,461,410, entitled "Gray Scale Printing Using Spatial Light Modulators", to J. M. Florence, et al., and in U.S. Pat. No. 5,461,411, entitled "Process and Architecture for Digital Micromirror Printer", to V. Venkateswar, et al. Each of these patents is assigned to Texas Instruments Incorporated and each is incorporated by reference herein.

MPU 11 receives graphical description data for the image to be printed, such as programming in a page description language. As explained below, MPU 11 interprets the programming, and provides bitmapped data that determines which mirrors will be on or off at any given time.

For purposes of providing a simple example, SLM 13b is illustrated as having only 4 rows of light-reflecting micromirrors. In practical applications, SLM 13b may have more rows and will have many columns. A typical SLM 13 might have 1000 or more elements per row. Light from a light source (not shown) is reflected by SLM 13b onto drum 16, in accordance with the "on" or "off" state of each micromirror. This state is determined by data delivered from an exposure data memory 13a. As explained below, memory 13a delivers one bit of data for each element to be addressed during a single line period, and may include look up tables or other hardware for converting the bitmapped data to binary form.

The image is reflected from SLM 13b and focused through an optics unit 13c. As shown in FIG. 1, light from SLM 13b falls onto drum 16, with each mirror providing light for one pixel on the image. Only one line of pixels is explicitly illustrated, it being understood that many lines of pixels are simultaneously illuminated by SLM 13b. Each pixel is either exposed or not, and thereby either charged or discharged for toner attraction. Two typical sizes for such pixels are 1/300 of an inch square and 1/600 of an inch square. The drum 16 will then rotate over the paper to be printed and the toner will be transferred from the drum 16 and fused to the paper, the line of pixels printing a line on the paper.

Figure 2:
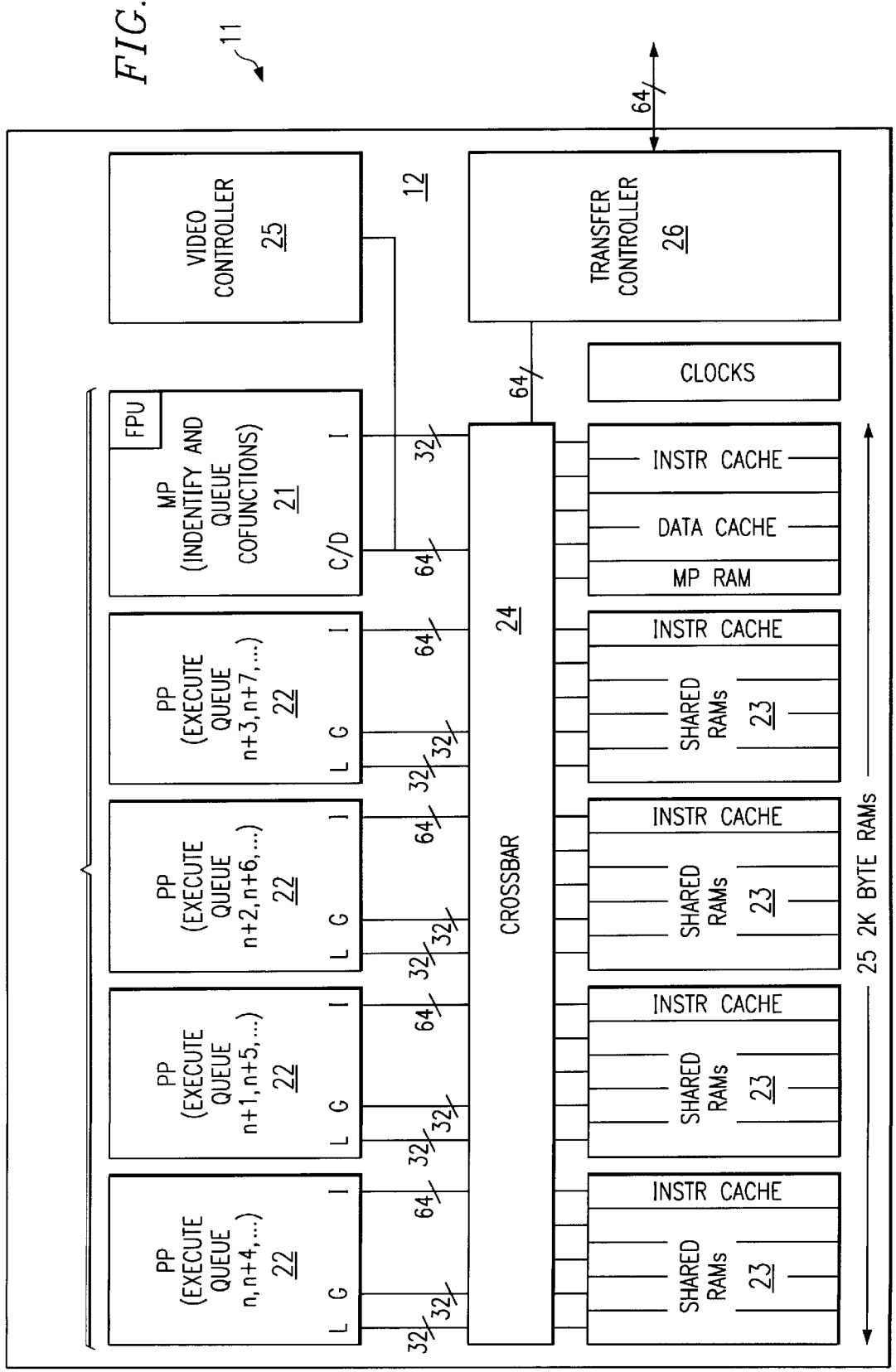
FIG. 2 illustrates the multiprocessor unit of FIG. 1.

FIG. 2 is a block diagram of MPU 11, configured for display list processing in accordance with the invention. A suitable MPU 11 is the TMS320C80 MVP, manufactured by Texas Instruments Incorporated. Other MPUs having similar characteristics could be substituted. MPU 11 can be a single-chip device, such as is the MVP, or can be comprised of multiple components.

In addition to the structural characteristics described below, an important functional characteristic of MPU 11 is the ability to interpret a high level graphical description programming representing high-resolution full-color images at acceptable speeds. To this end, the MVP is capable of performing 2 billion RISC-like operations per second (BOPs). The internal data memory transfer bandwidth is 2.4 Gbytes per second and the external data transfer bandwidth is 400 Mbytes per second.

MPU 12 has a master processor 21, a number of parallel processors 22, and RAM (random access memory) 23. All processors 21 and 22 are programmable. The processors 21 and 22 access RAM 23 via a crossbar switch 24. The crossbar switch 24 interconnects processors 21 and 22 in a manner such that different combinations of memory arrangements can be achieved as necessary for the particular operation.

The master processor 21 is a 32-bit RISC (reduced instruction set computer) processor with a floating point hardware unit (FPU). It has an instruction (I) port to access an instruction cache in RAM 23. It coordinates the processing by the parallel processors 22 and communicates with other components of the printer.

The parallel processors 22 are 32-bit integer units. Each parallel processor 22 has a global (G) and a local (L) port to access RAM 23, and an instruction (I) port to access an instruction cache in RAM 23. Each parallel processor 22 has two address generators, a three-input ALU, and a clock multiplier, all controlled with 64-bit instructions. The parallel processors 22 use a 64-bit instruction opcode. The instruction set is described primarily as an assembly language.

Transfer controller 26 is a direct memory access device, used for cache servicing and transferring blocks of data on or off multiprocessor unit 11.

RAM 23 is 50 K bytes of single-cycle memory, divided into 25 2 K-byte RAM units. Each processor 21 and. 22 has one RAM unit partially dedicated to storing interrupt vectors addresses and specifying parameters to the transfer controller 26. Each parallel processor 22 has three data RAM units that any processor 21 or 22 can access as shared memory. Each parallel processor 22 has one instruction cache RAM unit and the master processor 21 has two instruction cache RAM units. These RAMs are managed by an instruction cache controller in each processor. The master processor 21 also has two RAM units for data, managed by a data cache controller.

Further details describing the MVP are set out in U.S. Pat. No. 5,212,777, entitled "Multi-Processor Reconfigurable in Single Instruction Multiple Data (SIMD) and Multiple Instruction Multiple Data (MIMD) Modes and Method of Operation", assigned to Texas Instruments Incorporated. Additional information is available in various MVP *User's Guides* (1995), published by and available from Texas Instruments. These documents are incorporated by reference herein.

In operation, MPU 11 receives a graphic description program representing an image to be rendered. It interprets the program and builds a display list. This display list is a list of machine executable instructions (opcodes), each opcode having one or more parameters. The opcodes are the graphics primitives that will be used to render the image. For example, an opcode might represent an instruction to build a trapezoid, with the parameters specifying the dimensions. In the case of the MVP MPU 11, the opcodes are written in assembly language.

Some interpretation tasks are "independent" in that their execution does not depend on prior execution of another task. For a given page, these tasks can be executed in any order. For example, if Task 2 cannot execute until Task 1 finishes, Task 2 is not independent. On the other hand, examples of independent tasks are path to trapezoid conversion, color conversion, curve flattening, and font conversion. It is these independent tasks that may be processed as "cofunctions".

As explained below, master processor 21 is programmed to select cofunctions from interpretation tasks and to queue all cofunctions of the same type in a queue. One or more of the parallel processors 22 are programmed with a cofunction selector and interpreter, which checks all queues, selects a command buffer, interprets it, and executes the appropriate cofunction. Any number of parallel processors 22 can be used for executing cofunctions. Thus, the parallel processors 22 cooperate with the master processor 21 to build the display list.

Figure 3:
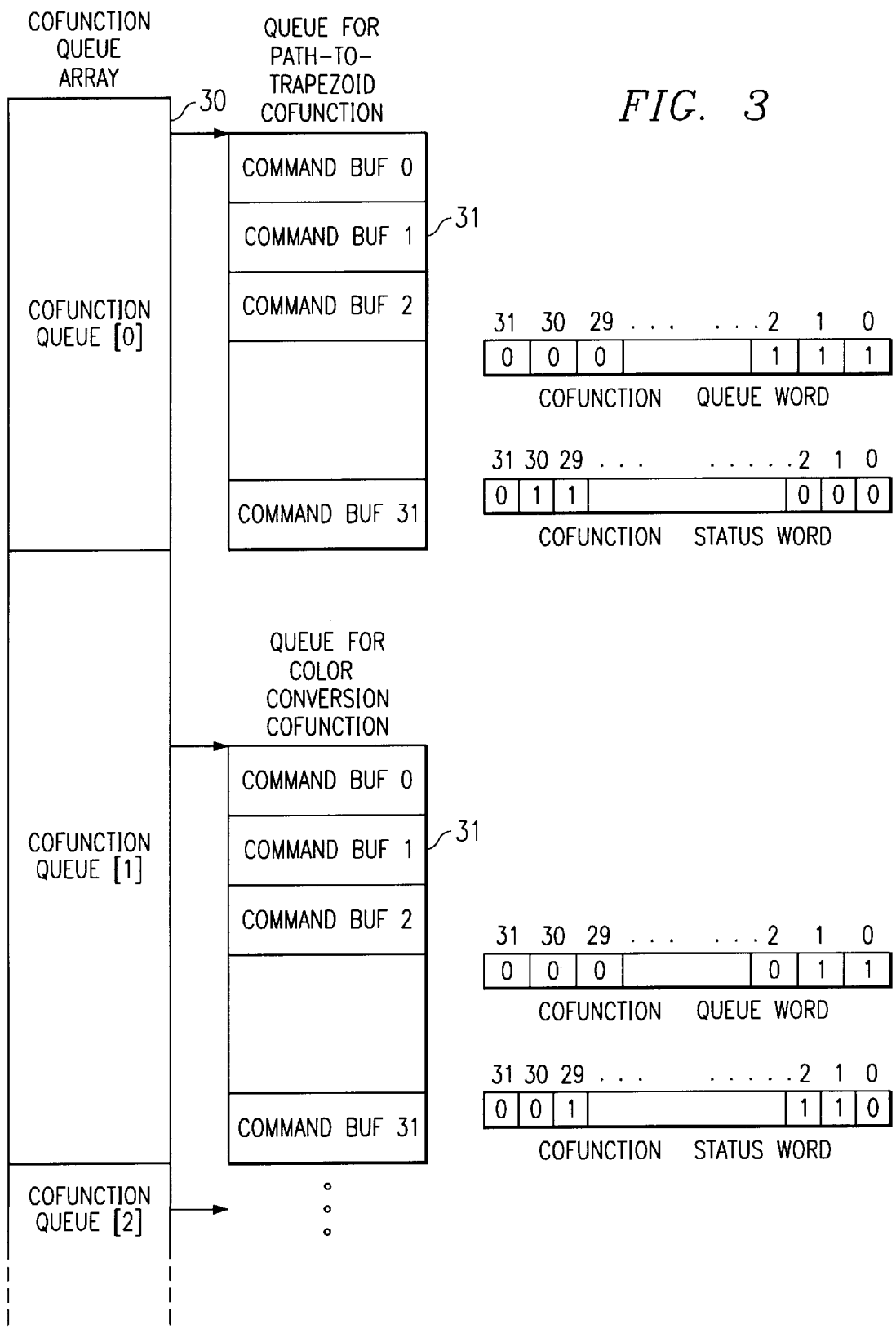
FIG. 3 illustrates the structure of the cofunction queues maintained by the master processor.

FIG. 3 illustrates the structure of the cofunction queues 31 maintained by master processor 21. As illustrated, separate queues 31 are maintained for different types of cofunctions. During a typical Postscript page interpretation, a particular cofunction might occur many times. Also, cofunctions can be executed in any order. This permits cofunctions of a particular type to be queued sequentially in a separate queue, so that a parallel processor 22 can continue executing that queue without code cache misses.

In the example of FIG. 3, two queues 31 for two cofunctions, path-to-trapezoid and color conversion, are explicitly illustrated, but in practice, there would be queues for many more types of cofunctions. There is a one-to-one correspondence of different types of cofunctions and the number of queues. Thus, if there are n different types of cofunctions, there are n queues 31. A cofunction queue array 30 contains a pointer to each queue 31.

In each queue 31, each cofunction has an associated command buffer. A command buffer has the following fields and field sizes:

| field | size |
| --- | --- |
| cofunction name | 4 bytes |
| size of command buffer | 1 byte |
| temporary memory address | 4 bytes |
| pointer to parameters | 4 bytes |

The field sizes are for purposes of example, and other field sizes could be used.

The cofunction name is used by the parallel processors 22 to invoke the cofunction. A fixed amount of temporary memory is allocated for the cofunction. The command buffer of the next cofunction can be obtained by adding the size (16 bytes after rounding to the nearest word boundary) of the current command buffer to the command buffer pointer. In the example of FIG. 3, each queue 31 stores 32 cofunctions, and thus has 32 command buffers.

The queue length is dependent on the amount of memory needed by a cofunction to store its parameters and inputs. For example, a path-to-trapezoid cofunction stores all its edges. The parameters are stored until the cofunction clears the space, which occurs only when it no longer needs the data.

A typical queue 31 might have a length of 1 kilobyte. Although cofunctions in a queue might have different command buffer sizes, the queue length can affect the number of cofunctions capable of being queued. As an example of the effect of queue length, an input page might have cofunctions of the same type with paths, P1, P2, P3 . . . P20, with P1 having parameters of size 500 bytes, P2 having parameters of 250 bytes, P3 having parameters of 50 bytes, and P4 having parameters of 400 bytes. The parameter size for these cofunctions (1200 bytes), exceeds the queue length (1000 bytes). In this case, only the first three paths can be accommodated in the queue. Until the parallel processor 22 executing the cofunctions clears some cofunctions from the queue, the next cofunction is not queued.

Each queue 31 is associated with two words, a queue word and a status word. The queue word indicates whether a particular cofunction in the queue has been executed. Each bit in the queue word corresponds to one command buffer in the queue. An "on" bit indicates that a command buffer is already queued, and cannot be overwritten. Thus, where a queue has slots for 32 cofunctions, its queue word is 32 bits. The queue is full when the queue word is 0xFFFFFFFF. Similarly, the status word indicates the status of the execution. Each bit in the status word corresponds to one command buffer.

Figure 4:
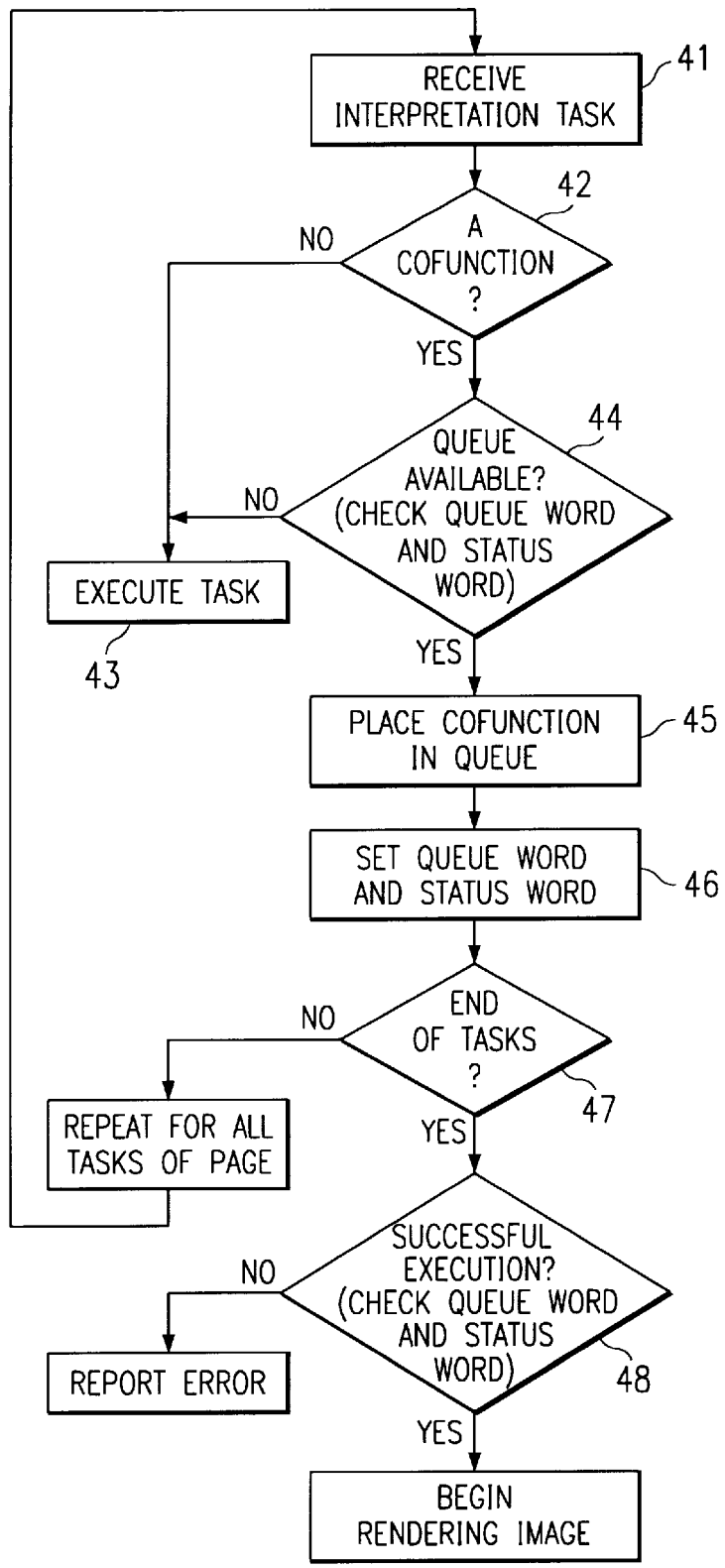
FIG. 4 illustrates the queuing process followed by the master processor.

FIG. 4 illustrates the queuing process followed by master processor 21 during interpretation of a Postscript program. Essentially, master processor 21 selects cofunctions from interpretation tasks and queues each type of cofunction in a separate queue.

In step 41, master processor 21 receives an interpretation task. It divides the task into subtasks.

In step 42, master processor 21 determines whether each subtask has been designated as a cofunction.

If the subtask is not a cofunction, in Step 43, master processor 21 executes the subtask.

Step 44 is performed if the subtask is a cofunction. Master processor 21 checks the queue word associated with the queue 31 for that cofunction. The queue word indicates whether there is an empty slot in that queue 31. Then, master processor 21 checks the corresponding bit in the status word. The status word indicates whether there was successful execution of the cofunction that previously occupied the slot. Both the queue word and the status word must indicate an available slot before the cofunction can be queued.

As an example of Step 44, if the 13th bit in the queue word is 0 (indicating an empty slot) and the 13th bit in the status word is 0 (indicating successful execution of the cofunction that previously occupied that slot), master processor 21 may place the new cofunction in that slot. If the status word indicates unsuccessful execution, master processor 21 reports an error and takes appropriate action.

In Step 45, master processor 21 places the cofunction in the appropriate queue 31. In Step 46, it sets the bit in the queue word corresponding to that slot to 1. It also clears the status bit in the status word.

After all cofunctions of the current page have been queued, in Step 48, master processor 21 checks all queue words. If any of them is non-zero, this indicates that one or more parallel processors 22 are still executing cofunctions. If this is the case, master processor 21 waits until all queue words are zero.

Master processor 21 then checks all status words. If all of them are zero, this indicates successful execution of all cofunctions. It interrupts the parallel processors 22 with a NoMoreCofunctions message.

The parallel processors 22 wait for master processor 21 to queue cofunctions and then execute them. They follow an infinite loop until receiving an interrupt from master processor 21.

More specifically, each parallel processor 22 checks the queue words to determine whether cofunctions are queued. When a parallel processor 22 encounters a queue with one or more cofunctions, it accesses the respective command buffer and executes the cofunction. After a parallel processor 22 has executed a cofunction, it clears the respective bit in the queue word and in the status word. If the execution was unsuccessful, it sets the appropriate bit in the status word. The parallel processor 22 continues to fetch command buffers from the same queue and execute the cofunctions. When there are no more cofunctions in that queue, the parallel processor 22 checks another queue word for cofunctions of another type. Thus, the processing of cofunctions is queue-by-queue. The queue order can be random.

When all queues are empty, the parallel processor 22 waits for the NoMoreCofunctions interrupt message from the master processor 21. The NoMoreCofunctions message indicates that all cofunctions for a page have been executed. The result is a display list (or some other set of instructions), which is used to render the page.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multiprocessor unit for a printer, operable to interpret a graphics description program comprised of plural independent cofinctions and non-cofunctions, comprising:

a stored plurality of cofinctions of the same and different specified types and non-cofunctions;

a master processor programmed to select a set of cofinctions and non-cofinctions from said stored plurality of cofunctions and non-cofinctions including cofinctions of the same specified type and cofunctions not of the same specified type for executing said graphics description;

a plurality of queues for storing cofunctions;

said master processor separating said non-cofunctions from said cofinctions and storing cofunctions of the same specified type in common ones of said queues; and at least one parallel processor, programmed to execute said cofunctions, such that said at least one parallel processor executes all cofunctions in a first of said queues before executing cofunctions in a next of said queues.

2. The multiprocessor unit of claim 1, wherein said master processor a nd said parallel processors are components of a single multiprocessor device.

3. The multiprocessor unit of claim 2, wherein said master processor and said parallel processor are connected via a crossbar switch.

4. The multiprocessor unit of claim 2, wherein said master processor and said parallel processors have shared memory on said device.

5. The multiprocessor unit of claim 1, wherein a memory operable to store said queues further stores a queue word for each of said queues, said queue word containing data indicating whether queue space is available.

6. The multiprocessor unit of claim 1, wherein a memory operable to store said queues further stores a status word for each of said queues, said status word containing data indicating whether cofunctions were successfully executed.

7. The multiprocessor unit of claim 1, wherein each of said queues is comprised of command buffers, one of said command buffers for each of said cofunctions.

8. The multiprocessor unit of claim 7, wherein said command buffer contains a pointer to an address of said memory where cofunction parameters are stored.

9. The multiprocessor unit of claim 1 wherein said non-cofunctions are processed by said master processor immediately upon recognition thereof as a non-cofunction.

10. A method of using a multiprocessor to interpret a graphics description program comprised of plural independent cofunctions and non-cofunctions, comprising the steps of:

providing a stored plurality of cofunction of the same and different specified types and non-cofunctions;

providing a master processor to select a set of cofunctions and non-cofinctions from said stored plurality of cofunctions and non-cofunctions including cofunctions of the same specified type and cofunctions not of the same specified type for executing said graphics description;

providing a plurality of queues for storing said cofunctions; separating said non-cofunctions from said cofunctions and storing cofunctions of the same specified type in common ones of said queues;

providing at least one parallel processor to execute said cofunctions; and executing all of the cofunctions in a first of said queues before executing cofunctions in a next of said queues.

11. The method of claim 10, wherein said step of using a master processor further comprises reading a queue word to determine whether a queue associated with a cofunction has space for storing that cofunction.

12. The method of claim 11, wherein said master processor sets a bit in said queue word associated with a cofunction after storing that cofunction.

13. The method of claim 10, wherein said step of using a master processor further comprises reading a status word to determine whether a queue associated with a cofunction has successfully executed another cofunction previously occupying said queue.

14. The method of claim 13, wherein said master processor clears a bit in said status word associated with a cofunction after storing that cofunction.

15. The method of claim 10, wherein said step of using at least one parallel processor is performed with multiple parallel processors acting simultaneously.

16. The method of claim 10, wherein said step of using at least one parallel processor further comprises writing to a queue word after executing a cofunction to indicate that space in a queue is available for a next cofunction.

17. The method of claim 9 wherein said non-cofinctions are processed by said master processor immediately upon recognition thereof as a non-cofunction.

\* \* \* \* \*